INVENTOR
Otmar Ringelhaan
BY Hill & Hill
ATTYS.

INVENTOR
Otmar Ringelhaan
BY [signature]
ATTYS.

INVENTOR
Otmar Ringelhaan
BY Spiel & Spiel
ATTYS.

| To | 1 | 2 | 3 | 4 | 5 | 6 | 7 | 8 | 9 | 10 |
|---|---|---|---|---|---|---|---|---|---|---|
| A1 | "1" | "0" | "0" | "0" | "1" | "0" | "1" | "1" | "1" | "0" |
| A2 | "1" | "1" | "0" | "0" | "0" | "1" | "0" | "1" | "1" | "1" |
| A3 | "1" | "1" | "1" | "0" | "0" | "0" | "1" | "0" | "1" | "1" |
| C | "0" | "0" | "1" | "0" | "0" | "1" | "1" | "1" | "0" | "0" |
| Ts | "0" | "0" | "1" | "1" | "0" | "0" | "0" | "0" | "0" | "0" |
| k | "0" | "0" | "0" | "1" | "0" | "1" | "1" | "1" | "0" | "0" |

INVENTOR
Otmar Ringelhaan.
BY S. Lee & S. Lee
ATTYS.

INVENTOR
Otmar Ringelhaan
BY Spice & Spice
ATTYS.

United States Patent Office 3,475,559
Patented Oct. 28, 1969

3,475,559

METHOD AND ARRANGEMENT FOR THE SYNCHRONIZATION OF DIGITAL TIME MULTIPLEX SYSTEMS

Otmar Ringelhaan, Munich-Neuaubing, Germany, assignor to Siemens Aktiengesellschaft, a corporation of Germany Filed Aug. 11, 1965, Ser. No. 479,018
Claims priority, application Germany, Aug. 13, 1964, S 92,627
Int. Cl. H04j 3/06
U.S. Cl. 179—15 11 Claims

ABSTRACT OF THE DISCLOSURE

The transmitting and receiving ends of a digital time multiplex system are synchronized by forming a digital characteristic number, the individual elements of which are dispersed in different channels of different time frames at the transmitting end and the receiving end utilizing the characteristic number to control synchronization of the two ends.

The invention relates to a method for synchronizing the sending and receiving sides of digital time multiplex systems and to arrangements for practicing the same. Transmission systems of this type have a large number of individual channels which are consolidated on the sending side into a collective channel and in this form are transferred to the receiving side. In the collective channel the individual channels are arranged in time sequence one after another, and present a periodically repeating pulse frame, which in each case includes a digital scanning value of each channel. On the receiving side the incoming pulse frame must again be subdivided into the individual channels, with maintenance of the allocation between the sending and receiving side channels. In order to be able to effect the correct time and correct phase allocation, there has to be co-transmitted from the sending side a synchronizing signal, with the aid of which the receiving device can determine the relationship of the incoming channels to the receiving side channels.

Multiplex systems are known in which, for the transmission of the synchronizing signal, an additional channel is provided. This means, however, among other things, an undesired increase of the transmission band width, which directly increases the total expense of such systems in a disadvantageous manner. If the transmission band width of one of the message channels is correspondingly reduced, the synchronizing signal can also be transmitted in the thus restricted channel. As a rule, however, there is not enough space for such a measure, because the band width of a channel is, for economic reasons, selected merely large enough that the demands made on the transmission quality are just fulfilled.

The invention has as its problem to provide a digital time multiplex system of the type previously descirbed, among other things, a synchronizing method in which the system for the transmission of the synchronizing signal operates without additional band width, and with negligible reduction of the transmission quality of the message channels.

Proceeding from a method for the synchronization of the sending and receiving side of at least one digital time multiplex system, on the sending side of which there is formed from the individual channels a pulse frame representing a composite channel, which pulse frame is transmitted toward the receiving side and thereupon, under maintenance of the allocation among the sending and receiving side channels, is again resolved into its individual channels, and in which the synchronizing signal is transmitted from the sending side to the receiving side, without requiring an additional channel, by a method in which impulses of certain channels are periodically replaced by synchronizing impulses, which here form a digital characteristic number, the problem is solved according to the invention by the feature that the individual elements of the digital characteristic number representing the synchronizing signals are transmitted in different channels of different pulse frames, and in particular, in such a way that the time interval of successive characteristic number elements remains constant.

The invention is based on the concept that a slight reduction of the quality of the message to be transmitted, for the avoidance of an additional transmission band width, can be accepted without impairment of suitable values of the system if, on the one hand, the digital character of the transmitted message is not altered and, on the other hand, no complicated division relations become necessary within the pulse frame.

Through the novel formation of the synchronizing signal as a digital characteristic number which is distributed in its elements over several pulse frames, and particularly in such a way that complicated division relations within the pulse frame are avoided, it is possible to utilize the above mentioned concept with relatively simple technical means.

There is already known a synchronizing method for a time multiplex system in which to each message channel there is additionally allocated a subchannel for special signals, for example call or selection signals, and in which the synchronizing signal is co-transmitted, without additional transmission band width, in the subchannels by the method that the signal information is in each case transmitted over the same impulse places of each second pulse frame of all channels and the synchronizing signals are transmitted over the same impulse places in predetermined channels of the remaining pulse frames. This process differs from the object of the invention, however, in essential features, since the synchronizing signal always is limited to one pulse frame, and within this pulse frame, is to be transmitted only in a few predetermined subchannels. Aside from these different features, the known process presents, as compared to the object of the invention, serious drawbacks, because the signal information here transmitted in the subchannels burdened with the synchronizing signal is considerably impaired with respect to its transmission quality. In the known method this is not serious only because the signal information data in such case are to a high degree redundant.

In the method of the invention expediently all the channels of the system are utilized for the transmission of a characeristic number in such a way that the interference caused thereby in each channel is equal.

In order to make the divisional proportions as simple as possible it is desirable to transmit the first element of a characteristic number in time interval from the last element of the preceding character number, which time interval is equal to the interval in time between two successive elements of one and the same characteristic number.

If the code signals transmitted in the individual channels have more than one element, it is expedient to replace in each case the element lowest in value by a characteristic number element, as the information content of the code signal will thus undergo the least impairment.

In time multiplex telephone systems, the individual speech channels are as a rule extended by an additional bit for the transmission of call or selection signals. Since such signals are to a pronounced degree redundant, it is advantageous to here transmit the characteristic number elements in such subchannels.

In a preferred arrangement for the practice of the method there is provided on the receiving side, besides the demodulator proper and the channel distributor following it, a search circuit evaluating the co-transmitted characteristic number for the synchronization of the channel distributor. Such search circuit includes a characteristic number generator indirectly controlled over frequency dividers by the receiving side basic frequency generator, and a comparison circuit which compares the received digital signal with the characteristic number generated by the characteristic number generator and, in the event of non-agreement, by means of a blocking impulse acting on a blocking device, brings about a delay of the entire receiving side time course by the duration of one basic timing pulse.

The blocking device in a simple manner can consist of a blocking gate, over which the basic timing generator is connected with the first frequency divider generating the signal frequency. To this first frequency divider there are then connected a second frequency divider generating the characteristic number frequency, and a third generating frame frequency, in which the output of the second frequency divider is supplied to the input of the characteristic number generator, the third frequency divider, for synchronizing purposes, likewise being connected with the characteristic number generator. The output of the latter in turn, is applied to one input of an exclusive OR circuit, to the second input of which is applied the incoming pulse frame, and at the output of which is disposed an AND circuit. The characteristic member frequency is applied to the input of the AND circuit, and preferably a delaying member is connected to the blocking input of the blocking gate. In an especially simple example of construction of characteristic number generator, the latter consists of an AND circuit, the two inputs of which are respectively supplied supplied with the characteristic number of frequency and the frame frequency.

If special demands are required on the brevity of the search time, there may be expediently provided as a characteristic number a chain code. The chain code generator needed for the generation of such a characteristic number in the search circuit may, in simple manner, consist of the connection of an n-stage shift register with a feedback network. For its use in the receiver search circuit there is allocated to the chain code generator a selector switch which, in its rest position, connects the input of the shift register over its one selection contact with the output of the feedback network and, in its operating position, over its other selection contact, with the incoming pulse frame. For the control thereof the selector switch is connected with a control device, preferably a monostable flip circuit which at its input side is connected, at least indirectly, to the output of the AND circuit delivering the blocking impulses and is so dimensioned that it shifts the selector switch into its operating position with each released blocking impulse for the duration of successive impulses of the characteristic number frequency. In this case, the third frequency divider, the one generating the frame frequency, has a synchronizing input, over which it is connected with one control output of the feedback network of the chain code generator.

With the aid of examples of construction which are represented in the drawing, the invention will be explained in detail in the following:

In the drawings, wherein like reference characters indicate like or corresponding parts:

Figure 4:
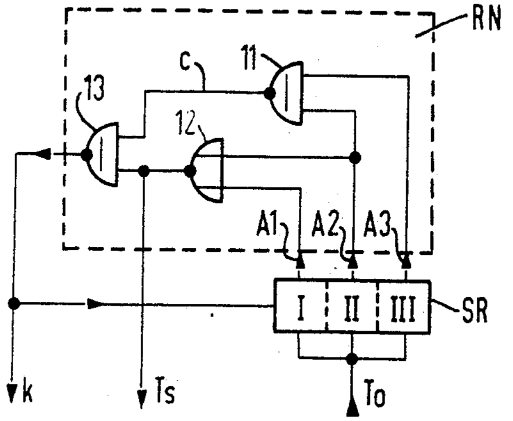
FIG. 4 illustrates a characteristic number generator which may be utilized in an arrangement for the practice of the invention.
Figure 6:
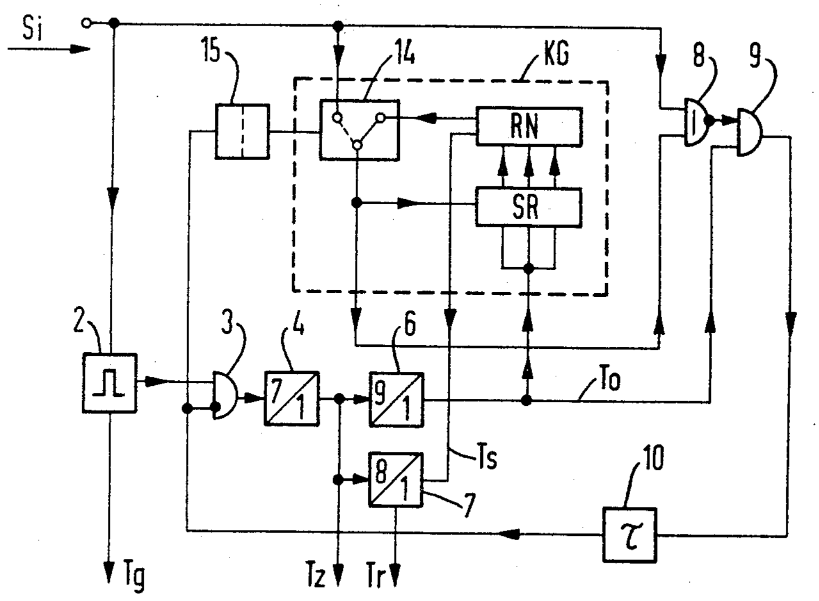
Figures 5A, 5B:
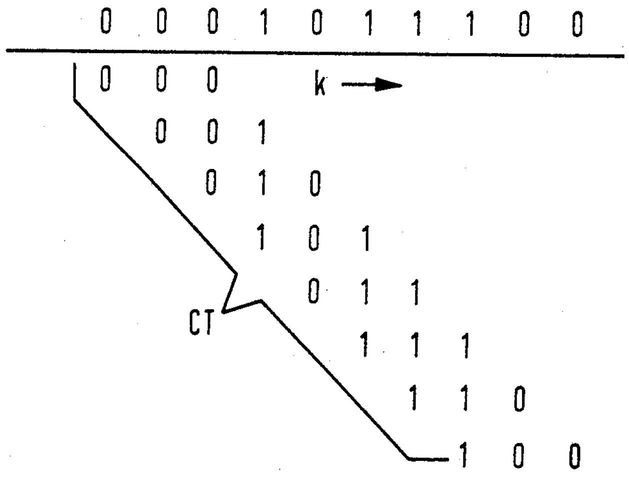
Figure 7:
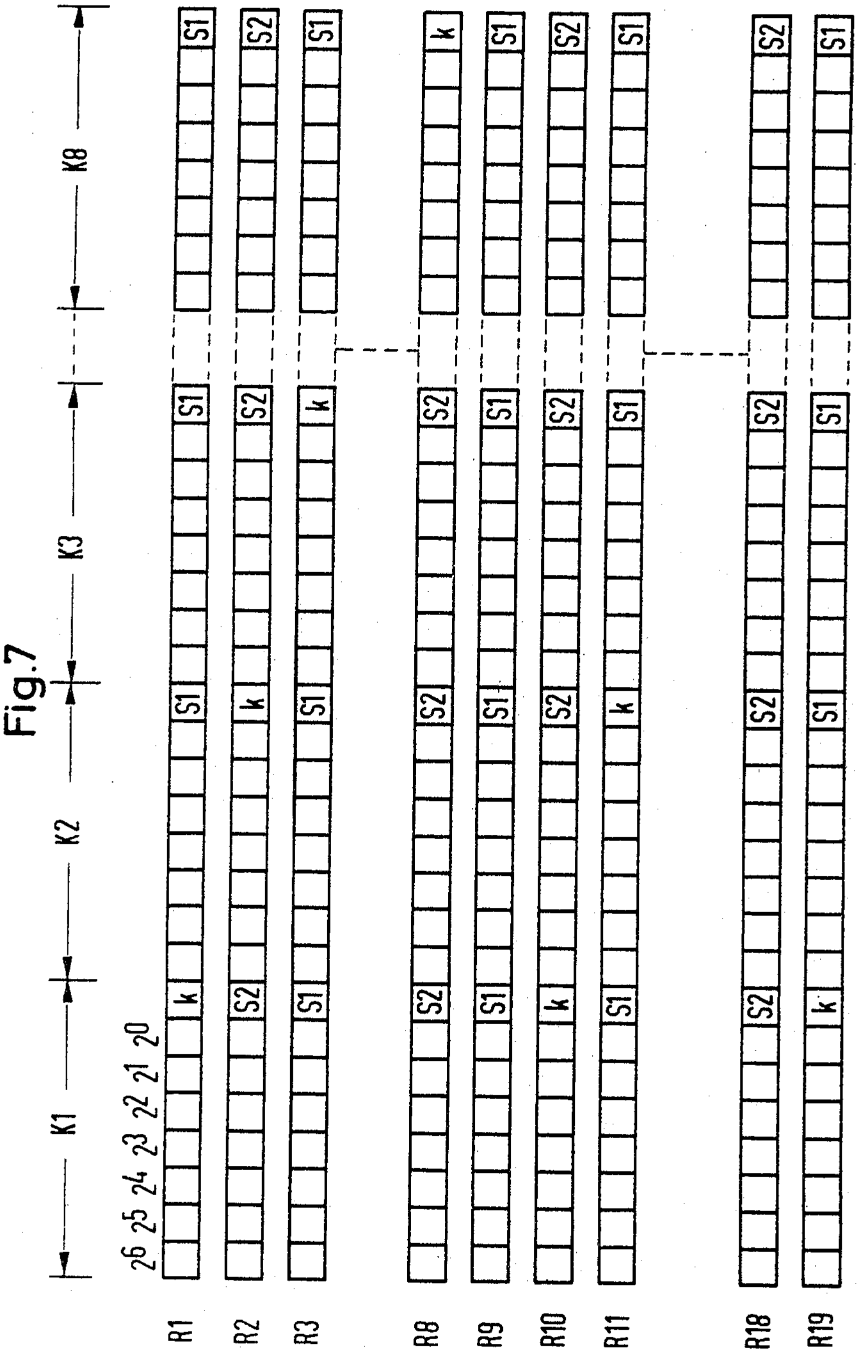

FIG. 5*a* is a tubular compilation of the functional course of an arrangement according to FIG. 4;

FIG. 5*b* is a representation of the characteristic number generated by the arrangement according to FIG. 4;

FIG. 6 illustrates another system for the practice of the method of the invention; and FIG. 7 illustrates a further schematic representation of the method of the invention with respect to its utilization in a time multiplex system.

Figure 1:
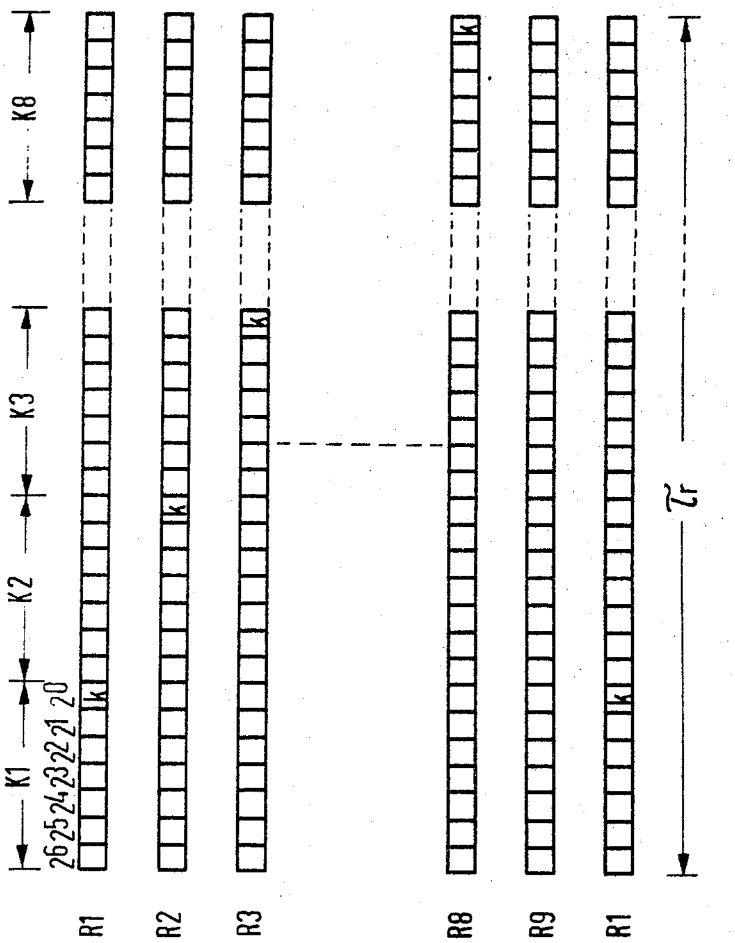
FIG. 1 is a schematic representation of the method according to the invention in its utilization in a time multiplex system.

In the schematic representation according to FIG. 1, several pulse frames R1 . . . R9 are represented, one below another, for a multiplex system having eight channels K1 . . . K8 with pulse code modulation. Here the messages transmitted in the channels are transmitted with a known code having seven elements $2^0$, $2^1$ . . . $2^6$. It is further assumed that the channels K1 . . . K8 involve speech channels with a scanning frequency of 8 kc. The pulse frame period $\tau p$, therefore, amounts to 125 $\mu$sec. In order to keep the reduction of the quality of the messages transmitted in the individual channels through the insertion of the characteristic number representing the synchronizing signal as low as possible, the individual elements *k* of the characteristic number are distributed over the eight channels in nine pulse frames, and transmitted in place of the lowest value element $2^0$ of the code. The period of the characteristic number thus extends over nine pulse frames and the period of its individual elements, in each case, over nine code symbols, so that in the pulse frames R1 . . . R8 in each case only one of the channels K1 . . . K8 is burdened with a number element. The frame R9, on the other hand, is without a characteristic number element, in order to also assure between the last element of a characteristic number and the subsequent first element of the further characteristic number the same time interval of 9 code symbols. There thus results for the characteristic number rhythm period $\tau_0$ of $$\tau o=\tau r+\tau r/8=140\ \mu\text{sec.}$$

In this inventive distribution of the elements of the characteristic number over all the channels there is thus achieved, in an advantageous manner, a uniform interference in all channels, in particular each ninth code sign of each channel being reduced, on account of a characteristic number element, to 6 bits. On the average this corresponds to a partically negligible quality sacrifice of 7 to 6.88 bits.

Figure 2:
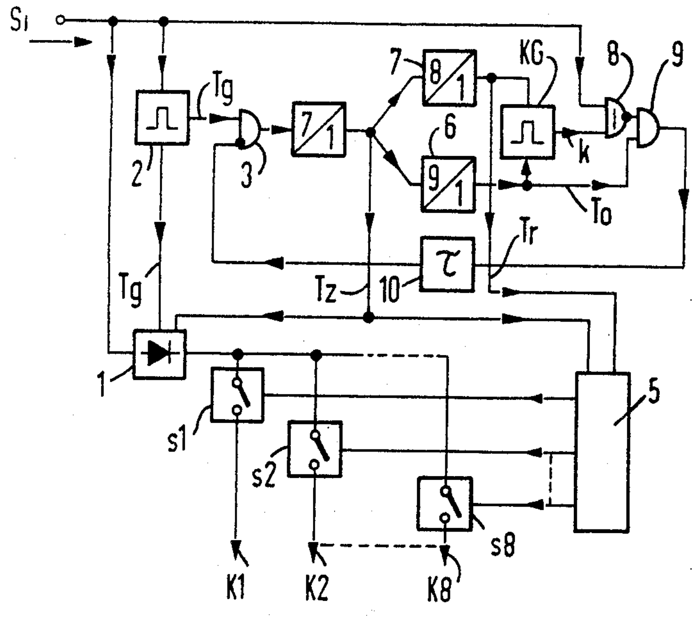
FIG. 2 illustrates a receiving arrangement for the practice of the method of the invention.

The examples of construction according to the invention illustrated in the subsequently described figures are laid out with a view to as simple and clear as possible a representation for a PCM system with eight channels utilizing a common binary seven-element code. FIG. 2 presents a block circuit diagram of the receiving side of such a PCM system, in which use is made of the method according to the invention. The incoming binary signal S*i* is fed to the demodulator 1 for the demodulation of the message channels and for the synchronization of the basic timing generators to the basic rhythm. The basic timing generator 2 delivers a basic frequency T*g*, over a first output to the demodulator 1 and over a second output and the blocking gate 3 to the first frequency divider, having a divider ratio of 7:1. The signal frequency T*z* thus obtained is required for the control of both the demodulator and the shift register 5, yet to be explained in detail. Further, the output of the frequency divider 4 is fed to the input of a frequency divider 6 with the divider ratio of 9:1 generating the frequency T*o* of the characteristic number, and to the input of the frequency divider 7 with the divider ratio of 8:1 generating the frame frequency T*r*. Both frequencies are required for the control of the characteristic number generator KG generating the characteristic number *k*. Further, the frame characteristic number T*r* functions in shift register 5 as a stepping pulse frequency. The output of the number generator KG is connected with the input of an exclusive OR circuit 8, at the second input of which the incoming pulse frame is applied. The output of the exclusive OR circuit 8 is extended to one input of an AND circuit 9, at whose other input is applied the characteristic number frequency T0. The output of the AND circuit 9 is connected over a delay member 10 by the blocking input of the blocking gate 3.

The previously mentioned, shift register 5 has eight stages, through which the individual impulses of the frame frequency pass in the rhythm of the signal frequency T*z*. Such shift registers presents, together with the channel switches *s*1 . . . *s*8 controlled by it, the receiving side channel distributor, while the circuit parts consisting of the characteristic number generator KG, the exclusive OR circuit 8, the AND circuit 9, and the blocking gate 3 represent the search circuit for the evaluation of the characteristic number transmitted from the sending side for the synchronization.

Figure 3:
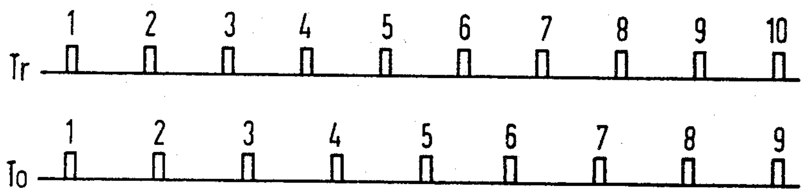
FIG. 3 is a time diagram according to the invention.

For a better understanding of the operation of the invention according to FIG. 2, in FIG. 3 the frame frequency and the characteristic number frequency T*r* and T*o* respectively, are plotted one below the other. As the diagram immediately makes evident, each tenth impulse of the frame frequency coincides in time with the ninth impulse of the characteristic number frequency. This criterion is utilized in the generator KG in order to establish the beginning of the impulse sequence appearing at its output, which sequence represents the characteristic number *k*. The characteristic number *k*, generated on receiving side is compared in the search circuit with the incoming binary signal S*i* by the method that, on the one hand, the exclusive OR circuit 8 gives off an impulse to the one input of the AND circuit 9 only if no agreement exists between the impulses at the inputs of the exclusive OR circuit 8 and, on the other hand, the AND circuit 9 delivers a blocking impulse over the delay member 10 to the blocking input of the blocking gate 3 only if an impulse occurring at the output of the exclusive OR circuit 8 coincides in time with an impulse of the characteristic number frequency. In other words, the occurrence of the blocking impulse means that the characteristic number *k* generated by the characteristic number generator KG does not agree with the compared digital signal of the incoming pulse frame. Each blocking impulse, therefore, blocks the blocking gate 3 disposed between the second output of the basic timing generator 2 and the frequency divider 4, for the period of one basic beat. It is thereby achieved that the whole receiving side time course is delayed by one period of the basic frequency. This action continues until at the inputs of the exclusive OR circuit 8, during the opening time of the AND circuit 9, representing a time filter, continuous agreement exists. Since the phase position of the frame frequency, which is also determinative for the phase position of the open periods of the channel switches *s*1 . . . *s*8, stands in a strict allocation to the phase position of the beginning of the characteristic number *k* generated by the characteristic number generator KG, on agreement of the received characteristic number with the characteristic number generated on the receiving side there is assured a fixed allocation of the incoming channel signals to the channels of the receiving side.

The delay member 10 in the connection between the output of the time filter and the blocking input of the blocking gate 3 is so dimensioned that the blocking impulse precisely suppresses the next impulse of the basic frequency T*g*. On the assumption that no additional time delay occurs in the feedback circuit of the search circuit, the time delay member 10 must, according to the PCM system used as a basis for the example of construction, have a time lag of 2.23 $\mu$sec.

The characteristic number generator KG contains, in general, a matrix arrangement which generates from the frame frequency T*r* and the characteristic number frequency T*o* the characteristic number *k*. In the simplest case, the generator may consist of one AND circuit. The characteristic number *k* consist in this case, as is directly intelligible in conjunction with the statements already made in connection with FIG. 3, of the binary digit sequence.

..00,10000000 10...

In the search circuit according to FIG. 2, in the least favorable case, all 504 impulses of a characteristic number period must be scanned. If it is further assumed, that for the recognition of a false synchronization on the average three pulses are necessary, then there results for a maximal search time $\tau s$ the relation $$\tau s=504\ (3)\ .\ \tau o\approx 0{,}2\text{ sec.}$$

This search time is relatively great and in systems with a large number of channels it assumes correspondingly greater values. A considerably shorter search time can be achieved if the searching process can be terminated as soon as the characteristic number locks in independently of the phase position. In this case there then would have to be scanned only all the impulses within one period of the characteristic number frequency, so that the search time is reduced, in first approximation, to an eighth.

In the realization of a search arrangement utilizing this principle it is to be considered that the characteristic number elements differ from the other signal impulses only by the periodic repetition of the characteristic number represented and this characteristic number can occur in any phase. Several successive impulses, therefore, must be evaluated before it can be recognized that these do not belong to the characteristic number. Only then may be receiving side time course be shifted by one period of the basic frequency. It is, accordingly, expedient in this case to select a characteristic number, in connection with which the decision as to whether there exists a false synchronisation becomes possible with a small number of examined impulses, and also that the characteristic number phase remains recognizable.

A characteristic number fulfilling these requirements can be represented in a simple and advantageous manner by means of a pseudo-chance sequence with the period $2^n$. Such a pulse sequence contains all the $2^n$ word combinations of *n* successive elements, and one of these word combinations suffices to define the phase of the sequence. For the recognition of a false synchronization, however, *n* successive impulses must be considered, because all *n* word combinations also occur, in principle, in the specific message transmitted.

Sequences of this type are generated by so-called chain code generators. Such generators consist, in most general form, of a shift register with *n* stages, the output of which is fed back over a network, which here presents a logical circuit, to the input of the shift register.

For the PCM system used as a basis for the examples of construction, with eight speech channels, there is suited a chain code with the period $2^n$ for $n=3$. A corresponding example of construction of such a generator is represented in FIG. 4. The shift register SR here consists of three stages I, II and III, to which the characteristic number frequency T*o* is fed. The feedback network RN consists, in turn, of an exclusive OR circuit 11, a NOR circuit 12 and another exclusive OR circuit 13. The imputs of the exclusive OR circuit 11 are connected with the outputs A2, A3 of the shift register stages II and III and the inputs of the NOR circuit 12 are connected with the outputs A1, A2 of the shift register stages I and II. The exclusive OR circuit 11 and the NOR circuit 12 operate with their outputs on the two inputs of the exclusive OR circuit 13, the output of which, in turn, is connected with the input of the shift register SR. The characteristic number *k* representing the chain code is taken at the input of the shift register. The output of the NOR circuit 12 delivers the control output for the synchronizing frequency T*s*, which, as will be subsequently explained with the aid of FIG. 6, serves for the synchronization of the receiver frequency distributor.

The manner of operation of the chain code generator according to FIG. 4 is presented in tabular form in FIG. 5*a*. In this table there are given the states occurring at the outputs A1, A2, A3 of the shift register, at the output *c* of the exclusive OR circuit 11, as well as the synchronizing frequency T*s* and the characteristic number *k* in dependence on the characteristic number frequency T*o*. In the table a "1" represents an impulse and "0" represents no impulse. In the table it is assumed that on occurrence of the first impulse of the characteristic sequence T*o*, in all three stages of the shift register a "1" is stored. Consequently on the first beat no impulse occurs at output *c*. In like manner there results for the characteristic number *k* and the synchronizing frequency T*s* the value "0." The "0" at the output of the exclusive OR circuit 13 is fed into the first stage of the shift register, so that in the second incoming impulse of the characteristic number sequence a "1" is present only at the outputs A2, A3. Since "1" at the two inputs of the exclusive OR circuit 11 yields a "0" at the output and the "1" and the "0" at the inputs of the NOR circuit 12 likewise yield a "0" at their output, there is again stored into the shift register a "0," etc., until, after completion of the eighth impulse of the characteristic number sequence, the column designated with 9 of the table, the starting condition is again reached. The period of the characteristic number *k*, therefore, has the sequence:

$$..o\,1\,1\,1,0\,0\,0\,1\,0\,1\,1\,1,0\,0..$$

In FIG. 5*b* this sequence is again represented in a digit scheme. The uppermost row of digits here forms the characteristic number, while the row of digits designated in the diagram with CT designates the eight code words of the chain code. These eight code words can be considered as having been derived through the shifting of a three place wide mask which, in each case, is shifted to the right by one place along the upper digit row.

FIG. 6 illustrates the block circuit diagram of a searching installation at the receiver according to the invention, which makes use of a chain code generator, consisting of a shift register SR and a feedback network RN, corresponding to FIG. 4. The arrangement according to FIG. 6 primarily differs from the arrangement according to FIG. 2 only through the feature that the chain code generator KG is controlled by the characteristic number frequency T*o*, that is, the frequency divider 7 generating the frame frequency T*r* no longer synchronizes the characteristic number generator, but vice versa, the characteristic number generator synchronizes the frequency divider 7 over the output of the NOR circuit 12 according to the synchronization frequency T*s* there present, as described with reference to FIG. 4. The chain code generator according to FIG. 4 is extended to the characteristic number generator KG of FIG. 6 by a selector switch 14, which is there inserted at the input of the shift register SR and, in rest position, connects the input of the shift register over a selection contact with the output of the feedback network RN, and in operating position over its other selector contact with the incoming binary signal S*i*. The selector switch is controlled indirectly by the blocking impulses, delivered on recognition of a false synchronization at the output of the AND circuit 9, through the monstable multivibrator 15. This multivibrator is so dimensioned that it switches over the selector switch 14 into the working position during three successive impulses of the characteristic number frequency.

As previously mentioned, the frequency divider 7, which delivers the frame frequency for the receiver channel distributor, is synchronized by the characteristic number generator through the synchronizing frequency T*s*. For this purpose, on detection of false synchronization and the blocking impulse thereby released, first of all the phase position of the chain code produced by the characteristic number generator is fixed by the method that from the incoming signal, during three successive beats of the characteristic number frequency, signal impulses are stored in the shift register. In the shift register the characteristic number produced by the chain code generator is then, with the new initial condition communicated to it in the manner described, compared with the received signal. This takes place until a false synchronization is again detected and thereby a new blocking impulse is generated in the manner already described with the aid of FIG. 2. The synchronizing frequency T*s* has, as will be seen from the table of FIG. 5*a* only one double impulse during a characteristic number period, with the aid of which double impulse the phase of the frame frequency produced by the frequency divider 7 is established. Thereby in the synchronism between the characteristic number produced by the characteristic number generator with the transmitted characteristic number there is determined also the phase position of the frame frequency and thereby the phase position of the impulses controlling the channel switches, in the manner desired.

On the assumption that on the average after three impulses a synchronization is recognized, there results in the case of the search circuit according to FIG. 6 as maximal search time:

$$\tau s = \frac{504}{8}(3+3)\tau o \approx 53 \text{ msec.}$$

In the equation, the second 3 appears through the fact that for the establishing of the initial condition of the characteristic number generator three periods of the characteristic number frequency are necessary.

In the examples of construction according to FIGS. 1 to 6 it has been set forth how with a characteristic number, making use of the process of the invention, speech channels transmitted in time multiplex systems between the sending and receiving sides can be synchronized. Fundamentally, in this manner many time multiplex systems standing in fixed phase relation can likewise be synchronized with a single characteristic number in the manner described. An example of this is schematically represented in FIG. 7. Here, the eight channels K1 . . . K8 of a pulse frame, in which messages are transmitted in a usual binary seven-element code, are extended by one additional bit for the transmission of the signals allocated to the individual channels. In each channel there are allocated to the sub-channel obtained in this manner two different signals S1 and S2. These signals are transmitted in the rhythm of the successive pulse frames, more specifically the signal S1 in pulse frame R1 and the signal S2 in pulse frame R2 and again the signal S1 in pulse frame R3, etc. The individual signals have, in other words, a period which is equal to twice the period of a pulse frame. In such a system the elements of the characteristic number *k* are again transmitted in the manner previously described in detail with respect to FIG. 1, being transmitted, however, as is indicated in FIG. 7, in such sub-channels. In distinction to FIG. 1, however, the period of the characteristic number must here extend over eighteen pulse frames in order to also assure a clear, unambiguous synchronization of the subchannels with respect to the signals S1 and S2 alternately therein transmitted. Moreover, thereby it is again achieved in an extremely advantageous manner, as in the example of construction according to FIG. 1, that the impairment of transmission brought about through the characteristic number is equal in all the subchannels for both signals. The signals S1 and S2 are as a rule redundant to a greater degree, so that the dropping out of a single information element of a subchannel in the rhythm of nine signal periods has, in practice, still less effect with respect to the reduction of the transmission quality than in the system according to the example of FIG. 1.

For the sake of completeness it is further addded that the example according to FIGS. 2, 3, 4 and 6 can in the same manner in principle be used in a system according to FIG. 7.

Changes may be made within the scope and spirit of the appended claims which define what is believed to be new and desired to have protected by Letters Patent.

I claim:

1. A method of effecting synchronization between the sending and receiving sides of at least one digital time multiplex system, in which there is formed from the individual channels, a pulse frame representing a collective channel, which frame is transmitted to the receiving side and thereupon, with maintenance of the allocation between the respective channels at the sending and receiving sides, is again restored into its individual channels, comprising the steps of replacing the impulses of certain channels periodically with synchronizing impulses to form a digital characteristic number, and transmitting the individual elements of the digital characteristic number in different channels of different pulse frames, selecting such pulse frames to provide a constant time interval between successive characteristic number elements, and controlling the synchronization at the receiving side with the use of such characteristic number.

2. A method according to claim 1, wherein all the channels of the system are utilized for the transmission of the characteristic number with the interference caused thereby in each channel being equal in magnitude.

3. A method according to claim 1, wherein the first element of a characteristic number is transmitted at a time interval from the last element of the preceding characteristic number which is equal to the time interval between two successive elements of one and the same characteristic number.

4. A method according to claim 1, wherein in each case the element lowest in value of the message transmitted in digital form in the individual channels is replaced by a characteristic number element.

5. A method according to claim 1, for a binary time multiplex system, in which the message channels for the transmisison of signals allocated to the individual channels, for example, call or selection signals, are intended by an additional bit, wherein the characteristic number elements are transmitted in such subchannels

6. An arrangement for effecting synchronization between the sending and receiving sides of a digital time multiplex system in which there is formed from the individual channels, a pulse frame representing a collective channel, which frame is transmitted to the receiving side and thereupon, with maintenance of the allocation between the respective individual channels at the sending and receiving sides, is again restored into its individual channels, having means at the sending side for replacing the impulses of certain channels periodically with synchronizing impulses to form a digital characteristic number, the elements of which are disposed in different channels of different pulse frames with the interval between successive characteristic number elements being constant, comprising, at the receiving side, a demodulator to which signals of the incoming collective channel are fed, channel distribution means operatively connected to said demodulator for supplying the signals of the individual channels to their respective channels at the receiving side, a basic timing impulse generator for controlling the operational timing of the system and a search circuit to which the incoming signals are fed, for evaluating the co-transmitted characteristic number for the synchronization of the channel distribution means, said search circuit comprising a characteristic number generator, frequency dividers operatively connecting said basic timing impulse generator and said characteristic number generator, whereby the latter is indirectly controlled by said basic timing impulse generator, circuit means for comparing the received digital signal with the characteristic number produced by the characteristic number generator, means responsive to nonagreement therebetween, for forming a blocking impulse, and a blocking device, responsive to such a blocking impulse for effecting a delay of the entire receiving-side time course by the duration of one basic timing impulse.

7. An arrangement according to claim 6, wherein the basic timing generator is connected over a blocking gate, comprising said blocking device, with the first of said frequency dividers producing the signal frequency following which is a second frequency divider producing the characteristic number frequency and a third frequency divider producing the frame frequency, of which the second frequency divider operates with its output on the timing input of the characteristic number generator, and the third of said frequency dividers, for synchronizing purposes, likewise is connected with the characteristic number generator, an exclusive-OR circuit, the output of the characteristic number generator, in turn, being connected to input of said exclusive-OR circuit, on the second input of which there is fed the incoming pulse frame, an AND-circuit, the output of said OR-circuit being connected to one input of said AND-circuit, to the second input of which the characteristic number frequency is fed, the output thereof being connected to the blocking input of said blocking gate.

8. An arrangement according to claim 6, wherein the characteristic number generator consists of an AND-circuit, to both inputs of which there are fed the characteristic number frequency and the frame frequency.

9. An arrangement according to claim 6, wherein the characteristic number generator has a chain code generator consisting of an *n*-place shift-register and a feed back network, with the code period as the characteristic number, in which system there is inserted at the input of the shift register a selector switch, said selector switch, in rest position, connecting the input of the shift register over its one selection contact with the output of the feedback network and in its working position, over its other selection contact, with the incoming digital signal, and control devices for operating the selector switch, preferably a monostable flip stage which, at its input side, is connected at least indirectly to the output of the AND-circuit and is so dimensioned that with each released blocking impulse it switches over the selector switch into its working position for the duration of *n* successive impulses of the characteristic number frequency.

10. An arrangement according to claim 9, wherein the third frequency divider, producing the frame frequency, has a synchronizing input, over which it is connected with a control output of the feedback network of the chain code generator.

11. An arrangement according to claim 7, comprising a time delay circuit interposed between the output of said AND-circuit and said blocking input of said blocking gate.

References Cited

UNITED STATES PATENTS

| | | |
|---|---|---|
| 3,083,267 | 3/1963 | Weller. |
| 3,065,302 | 11/1962 | Kaneko. |
| 3,341,660 | 9/1967 | Duerdoth. |

RALPH D. BLAKESLEE, Primary Examiner